Figure 2:
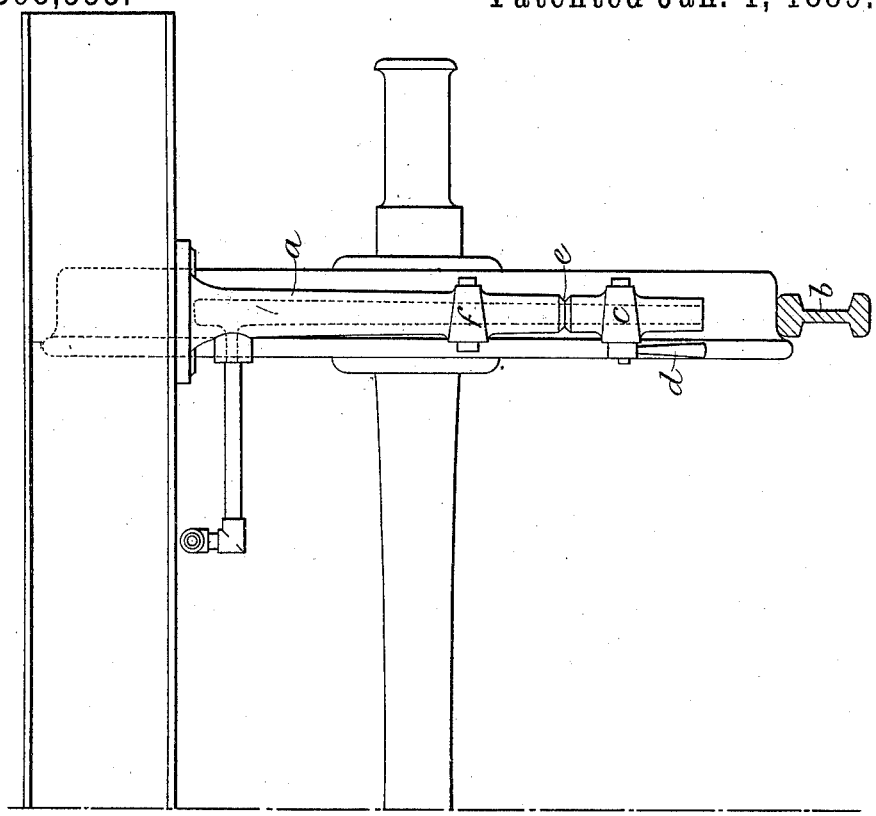

(No Model.)

P. EVERITT.
AUTOMATIC BRAKE.

No. 395,555. Patented Jan. 1, 1889.

Witnesses
Will T. Norton
Wm. M. Terrell

Inventor
Percival Everitt
by John J. Halsted
his Attys.

UNITED STATES PATENT OFFICE.

PERCIVAL EVERITT, OF LONDON, ENGLAND.

AUTOMATIC BRAKE.

SPECIFICATION forming part of Letters Patent No. 395,555, dated January 1, 1889.

Application filed January 15, 1887. Serial No. 224,504. (No model.) Patented in England December 8, 1885, No. 15,066; in Germany September 19, 1886, No. 38,689, and in France September 20, 1886, No. 178,634.

*To all whom it may concern:*

Be it known that I, PERCIVAL EVERITT, a subject of the Queen of Great Britain, residing at London, England, have invented new and useful Improvements in or applicable to Automatic Brakes, (for which I have obtained patents in the following countries, namely: Great Britain, No. 15,066, dated December 8, 1885; France, No. 178,634, dated September 20, 1886, and Germany, No. 38,689, dated September 19, 1886,) of which the following is a specification.

My invention relates to devices used in connection with air-brakes for railway cars or engines, and designed to act when a car or a car-wheel leaves the track, or when any dangerous obstruction to the passage of a wheel is encountered, to open a connection between the air-brake pipe and the external air, whereby the brakes will be at once applied.

According to my invention the said brakes are automatically applied as soon as any wheel in a train shall leave the metals, or as soon as any dangerous obstruction to the passage of a wheel is encountered by a train in motion. For this purpose I provide the engine or carriage with a pipe or pipes which act as safety-pipes from the main-train connection, such pipes being so bent or shaped as to form pendent pipes terminating within a short distance from the rail. These pendent safety-pipes are fitted with a cock or valve or its equivalent provided with a lever or rod so arranged that should the engine or a carriage leave the metals or a dangerous obstruction be met the said lever or rod would come in contact with the rails, a sleeper, or the earth, or otherwise upon the encounter of said pipe with any dangerous obstruction, and thereby move round the plug of the cock and admit air and thus put on the brakes.

In practice I find it advantageous to weaken the pendent pipes above the cock by employing a reduced thickness of metal or equivalent means, so that in case the lever should from any cause not act the pipe, on coming in contact with any obstacle—such as the rail or a sleeper—would break off at the weakened part and admit air.

It will be obvious that instead of employing a cock whose movable plug is acted upon by a lever a fixed plug may be used to close the lower end of a safety-pipe, and that if the pipe be weakened, as above described, then on the carriage leaving the rails, or on a dangerous obstruction being met, a portion of the safety-pipe will be broken off and a communication opened between the air in the train-pipe and the external air, which will cause the brakes to operate, as will be hereinafter more fully explained.

In order to close the pendent pipe, after it has been broken, against the air when the train is again started, the pendent pipe is advantageously provided with a cock or valve above the weakened part of the pipe, or other means of closing the broken pipe may be provided—such as a plug or stopper.

In order to enable my invention to be fully understood, I will proceed to describe the same by reference to the accompanying drawings, in which—

Figure 1:
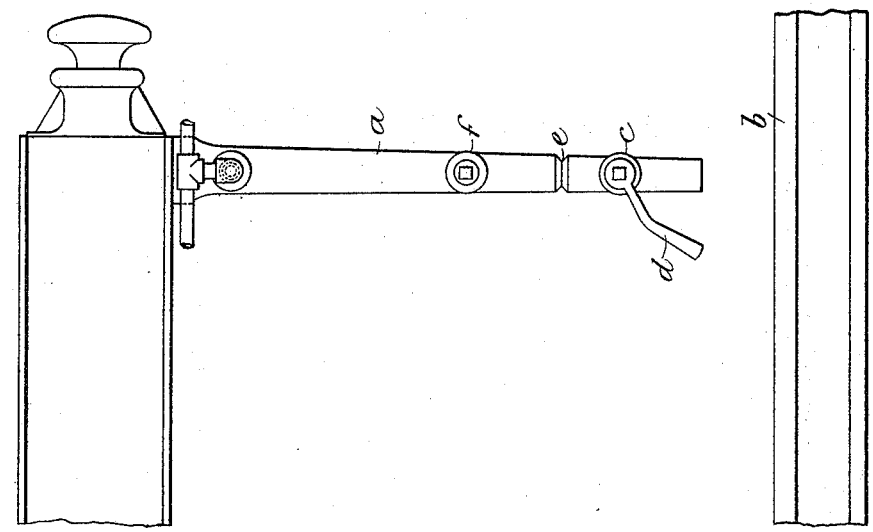

Figure 1 represents a longitudinal elevation of part of the under frame of a railway-carriage, showing a weakened pendent pipe open at its lower end and having a cock above and a cock below the weakened part; and Fig. 2, a part end elevation of the same.

Similar letters represent similar parts in both the figures.

$a$ is the pendent pipe, open at its upper part to the main-train connection, its lower end, which extends to within a short distance of the rail $b$, being provided with the cock $c$, on the flat of which is the lever $d$. The pendent pipe $a$ is closed at its lower end and is weakened at a short distance above the lower end, as illustrated at $e$. $f$ is another cock placed above the weakened part $e$, the said cock in its normal position being open. On the train leaving the rails and the lower end of the pipe coming against the rail, a sleeper, or the earth, the portion of the pipe below the weakened part $e$ thereof would be broken off, thus admitting air and putting on the brakes. When the train is again started, the cock $f$ would of course have to be closed.

The closed pendent pipe or hollow plug, if of cast metal, need not have a reduced or weakened place, because the metal itself will break when encountering an obstruction. If made of wrought metal, it should be weakened at a suitable point.

I am aware that a bent tube made of frangible material—such as glass, pottery, and the like—has been proposed to be employed, and also that frangible bulbs have been disposed about a car-truck or its appurtenances, such pipe or bulb being arranged to be broken by coming in contact with the rail, or in some instances by coming in contact with some part of the car. These I do not claim.

Having now particularly described and ascertained the nature of my said invention and in what manner the same is to be performed, I declare that what I claim is—

1. The combination, with an air-brake pipe, of a pipe pendent therefrom, the same being weakened at a suitable point, a normally-closed valve in said pipe, and an external swinging arm connected with said valve for opening the same, substantially as set forth.

2. The combination, with an air-brake pipe, of a pipe pendent therefrom, the same being weakened at a suitable point, a normally-closed valve in said pipe, an external swinging arm connected with said valve for opening the same, and a valve for closing said pipe above said normally-closed valve and said weakened point, substantially as set forth.

PERCIVAL EVERITT.

Witnesses:
G. F. REDFERN,
F. W. PRICE.